United States Patent [19]

Meyer et al.

[11] 4,272,403

[45] Jun. 9, 1981

[54] BORIC ANHYDRIDE SOLUTIONS AND THEIR USE AS HARDENERS OF RESOLS

[75] Inventors: Nicolas Meyer, Bully les Mines; Raymond Foulon, Bruay en Artois, both of France

[73] Assignee: Societe Chimiques des Charbonnages SA, Paris La Defense, France

[21] Appl. No.: 49,009

[22] Filed: Jun. 15, 1979

[30] Foreign Application Priority Data

Jun. 19, 1978 [FR] France ................... 78 18279

[51] Int. Cl.$^3$ .................... B01J 31/02; B01J 21/02
[52] U.S. Cl. .................... 252/428; 252/432; 260/19 N; 260/38; 528/138
[58] Field of Search .................... 252/428, 432

[56] References Cited

U.S. PATENT DOCUMENTS

| | | | |
|---|---|---|---|
| 2,413,777 | 1/1947 | Oakley et al. | 252/432 X |
| 3,306,860 | 2/1967 | Rowell et al. | 252/432 |
| 3,347,916 | 10/1967 | Huber | 252/432 X |
| 3,679,710 | 7/1972 | Forster | 252/428 X |
| 4,123,414 | 10/1978 | Millette | 260/38 |

FOREIGN PATENT DOCUMENTS

| | | |
|---|---|---|
| 1524731 | 4/1968 | France . |
| 2016760 | 5/1970 | France . |
| 2246596 | 2/1975 | France . |
| 2331587 | 10/1977 | France . |
| 2352021 | 12/1977 | France . |
| 1144192 | 3/1969 | United Kingdom . |
| 1272566 | 5/1972 | United Kingdom . |

*Primary Examiner*—Patrick Garvin
*Attorney, Agent, or Firm*—Millen & White

[57] ABSTRACT

Concentrated boric anhydride solutions containing more than 5% of boric anhydride in an organic solvent selected from mono or polyalcohols, trialkylborate and/or dialkylacetal when the solvent also contains an acid selected from sulfuric acid and/or aromatic acids. These solutions are used as hardeners of formo-phenolic resols, more particularly for the manufacture of laminates comprising glass fibers and formo-phenolic resols.

18 Claims, No Drawings

BORIC ANHYDRIDE SOLUTIONS AND THEIR USE AS HARDENERS OF RESOLS

BACKGROUND OF THE INVENTION

The present invention is related to boric anhydride solutions and the use of these solutions as hardeners of resols.

Boric anhydride ($B_2O_3$) is a product which has numerous uses including use as a fire-proofing agent, as a dehydrating agent, as a catalyst or as a co-catalyst. The product is in a solid form (particles, granular form, powders) and no solvent is known in which boric anhydride has an appreciable solubility at least equal to 5 percent by weight. In order to facilitate handling and dispersion of boric acid in reaction mixtures it is desired to use boric anhydride in liquid form such as in the form of solutions, preferably concentrated solutions. This is one object of the present invention.

SUMMARY OF THE INVENTION

It has been found that anhydrous solutions having high concentrations of boric anhydride are obtained when boric anhydride is added to one or more organic solvents in the presence of an acid chosen among concentrated sulfuric acid and aromatic sulfonic acids. It has been found that boric anhydride, which is only slightly soluble either in an acid or in a solvent, dissolves in noticeably increased quantities in organic solvents or mixtures of solvents in the presence of at least one acid.

The obtained solutions are anhydrous and most often clear. Sometimes owing to the presence of water a slight hydrolysis of anhydride takes place and the obtained solution is slightly turbid.

The concentration in boric anhydride of the obtained solutions is variable and depends on the solvent or on the solvents and on the acid which are used. However limpid solutions containing up to 40 percent by weight of boric anhydride are easily obtained.

The organic solvents used according to the present invention are mono or polyalcohols, trialkylborates, or dialkylacetals of formol. Suitable organic solvents are for example, methanol, ethanol, propanol, butanol, ethylene glycol, propylene glycol, trimethyl borate [$B(OCH_3)_3$] or methylal [$CH_2(OCH_3)_2$]. Preferably the mixtures of trimethyl borate and methanol or of trimethyl borate and methylal are used. When using these mixtures the dissolution speed of boric anhydride is increased by about ten times. Moreover these mixtures of solvents are easy to find and are therefore less expensive. This is for example the case for the mixture of trimethylborate and methanol.

The presence of an acid even used in slight amounts increases the solubility of boric anhydride in the solvent. The solubility of boric anhydride increases with the added amount of acid. In practice a quantity of acid equal to at least 5 percent by weight in comparison with boric anhydride solution and at most 70 percent by weight is suitable. When amounts of acid inferior to 5 percent by weight are used, the solutions obtained contain large amounts of solvents which have to be eliminated when the solutions are used as catalysts of resols. When solutions contain more than 70 percent by weight of acid the obtained catalytic system is too efficient. Generally according to the present invention solutions containing at least 10 percent by weight and preferably 15 to 50 percent by weight of acid are used.

Suitable aromatic sulfonic acids are for example paratoluene sulfonic acid, benzene sulfonic acid and xylene sulfonic acid.

The mixtures of the present invention containing at least one organic solvent such as described hereabove and at least one acid selected from sulfuric acid and aromatic sulfonic acids have in regard to boric anhydride a solvent power which is superior to the solvent power of the constituents taken alone, (the solvent power is defined as being the maximum concentration of boric anhydride in the solution).

The solutions of the present invention are prepared according to known ways, the different constituents being added in any order except for sulfuric acid for which the usual rules are to be followed. The mixture is achieved with stirring at room temperature.

Another object of the present invention is the use of the obtained solutions as hardeners of formo-phenolic resols.

U.S. Pat. No. 4,123,414 relates to a process for the manufacture of laminates constituted by glass fibers and formo-phenolic resols according to which the formo-phenolic resol, hardener, glass fibers and a dehydrating agent, in particular solid, boric anhydride, are simultaneously sprayed on a mold.

This process has two drawbacks: it is necessary to achieve a simultaneous spraying of products in the liquid form and of products in the solid form, and to determine in a precise way the amount of one of the two used solid products ($B_2O_3$); the second drawback being that molding has to be carried out by the spraying of the constituents technique.

By using solutions of the present invention the difficulties described hereabove are resolved. The hardener (sulfuric acid and/or aromatic sulfonic acid) used contains boric anhydride in a well defined proportion and being in a liquid form is easy to use. Furthermore it is possible to prepare the laminates by injection or by molding with a press according to the hot or cold technique. The solutions according to the present invention are suitable for the hardening of resols. The skilled art worker will choose solutions with a solvent which is compatible with the aqueous solution of resol.

The obtained solutions according to the present invention are suitable for the known resols: either the resols obtained only by condensing formol and phenol in the presence of an alkaline catalyst or a resol containing also additive compounds, such as surfactants or plasticizers. The solutions obtained according to the present invention can be used as the sole catalysts for the resols. In such a case it is preferable that the acid concentration be at least 15 percent by weight, since for weaker concentrations of acid, large amounts of solvents are present. However in addition to solutions described in the present invention it is possible to use other catalysts which are known. The boric anhydride concentration in the solutions of the present invention is preferably comprised between 10 and 35 percent by weight based on the weight of solution.

The following examples are given by way of illustration. Quantities are given in parts by weight.

EXAMPLE 1

Solutions were prepared by adding with stirring powdery boric anhydride and varying acids and solvents. Table 1 gives boric anhydride solubility.

TABLE 1

| COMPOUND | | | BORIC ANHYDRIDE SOLUBILITY |
|---|---|---|---|
| Sulfuric acid 95 percent by weight | | | 2.25% |
| Methylal | | | 1.40% |
| Methanol | | | 2.00% |
| Ethanol | | | 2.60% |
| Dipropylene glycol | | | 0.80% |
| Trimethyl borate | | | 3.50% |
| Mixture (in weight) | trimethyl borate methanol | 70% 30% | 4.50% |
| Mixture (in weight) | trimethyl borate isopropanol | 70% 30% | 2.00% |
| Mixture (in weight) | trimethyl borate butanol | 70% 30% | 1.50% |

EXAMPLE 2

Example 1 was repeated by using mixtures of acid and solvents. Table 2 gives boric anhydride solubility at room temperature.

TABLE 2

| | | | ADDED ACID AMOUNT | BORIC ANHYDRIDE SOLUBILITY |
|---|---|---|---|---|
| SOLVENT | | | | |
| Trimethyl borate | | | + 5% paratoluene sulfonic acid | 24% |
| Trimethyl borate | | | + 20% paratoluene sulfonic acid | 40% |
| Trimethyl borate | | | + 40% paratoluene sulfonic acid | 46% |
| Trimethyl borate | | | + 60% paratoluene sulfonic acid | 60% |
| Mixture (in weight) | Trimethyl borate Methanol | 70% 30% | + 5% sulfuric acid | 16.50% |
| Mixture (in weight) | Trimethyl borate Methanol | 70% 30% | + 20% sulfuric acid | 37.00% |
| Mixture (in weight) | Trimethyl borate Methanol | 70% 30% | + 40% sulfuric acid | 48.00% |
| Mixture (in weight) | Trimethyl borate Methanol | 70% 30% | + 60% sulfuric acid | 60.00% |
| COMPOUND | | | | |
| Methylal | | | + 5% paratoluene sulfonic acid | 26% |
| " | | | + 20% paratoluene sulfonic acid | 30% |
| " | | | + 30% paratoluene sulfonic acid | 38% |
| " | | | + 60% paratoluene sulfonic acid | 60% |

EXAMPLE 3

Example 2 is repeated by using mixtures of solvents.

| COMPOUND | ADDED ACID AMOUNT | BORIC ANHYDRIDE SOLUBILITY |
|---|---|---|
| Trimethyl borate (100 parts) Methanol : 30 parts | 5 parts paratoluene sulfonic acid | 43% |
| Trimethyl borate (100 parts) Ethanol : 30 parts | 30 parts paratoluene sulfonic acid | 47% |
| Trimethyl borate (100 parts) Isopropanol : 30 parts | 30 parts paratoluene sulfonic acid | 48% |
| Trimethyl borate (100 parts) Butanol : 30 parts | 30 parts paratoluene sulfonic acid | 58% |

EXAMPLE 4

Solutions were prepared by adding with stirring at room temperature powdery boric anhydride to a solution of 98% sulfuric acid solution at or aromatic sulfonic acid in a solvent.

Table 3 gives the composition of the obtained solutions.

EXAMPLE 5

Use of the solutions obtained according to the present invention.

Formo-phenolic resols were obtained by condensing formol with phenol in the presence of a sodium hydroxide solution, then by neutralisation of the obtained product up to pH 7, and drying under vacuum until desired viscosity was reached.

Resol $R_1$ was used as it was.

Resol $R_2$ was diluted with methanol (5 parts per 100 parts of resol); the obtained product had a viscosity equal to 8 poises at 20° C;: it was named $R_2'$.

Resol $R_3$ was diluted with dipropylene - glycol (12 parts per 100 parts of resol, the obtained product had a viscosity equal to 15 poises at 20° C.: the obtained product was named $R_3'$.

In table 4, the dried extract which is given had been obtained by drying 4 g of resol for 3 hours at 140° C.

The obtained resols were mixed with the hardening solutions described in example 4. The mixture was achieved at 25° C.: the pot life is given at this temperature.

The obtained results are given in table 5.

TABLE 3

| Solutions Compounds | S1 | S2 | S3 | S4 | S5 | S6 | S7 | S8 | S9 | S10 | S11 | S12 | S13 | S14 | S15 | S16 |
|---|---|---|---|---|---|---|---|---|---|---|---|---|---|---|---|---|
| $B(OCH_3)_3$ | 45.4 | 34.7 | 40.3 | 47.6 | 47.1 | 57.2 | 55.6 | 40.9 | 34.1 | — | — | — | — | — | — | — |
| $CH_2(OCH_3)_2$ | — | — | — | — | — | — | — | — | — | 40.8 | 50 | 50 | 43.5 | 55.9 | 43.2 | — |
| $CH_3OH$ | — | — | — | — | — | — | — | — | 16.7 | — | — | — | — | — | — | 47 |
| $H_2SO_4$ | — | — | — | — | — | — | — | — | — | — | — | — | — | 17.9 | 5.4 | — |
| ATS(*) | 27.3 | 48.6 | 40.3 | 33.3 | 29.4 | 21.4 | 19.4 | 27.3 | 22.8 | 32.6 | — | — | 30.4 | — | 24.3 | 42.4 |
| ABS(*) | — | — | — | — | — | — | — | — | — | — | 30 | — | — | — | — | — |
| AXS(*) | — | — | — | — | — | — | — | — | — | — | — | 30 | — | — | — | — |
| $B_2O_3$ | 27.3 | 16.7 | 19.4 | 19.1 | 23.5 | 21.4 | 25 | 31.8 | 26.4 | 26.6 | 20 | 20 | 26.1 | 26.2 | 27.1 | 10.6 |

(*)ATS paratoluene sulfonic acid
(*)ABS benzene sulfonic acid
(*)AXS xylene sulfonic acid
Amounts are given in percent by weight.

TABLE 4

| Resol | Molar ratio Formol/phenol | Temperature °C. | Reaction time (minutes) | Viscosity °C. Poises | Dried Extract percent by weight |
|---|---|---|---|---|---|
| R1 | 1.5 | ebullition | 45–50 | 25–30 | 72–76 |
| R2 | 1.5 | " | 65–75 | 28 | 72–73 (after dilution R2') |
| R3 | 1.5 | " | 35 | 25 | 74 (after dilution R3') |

TABLE 5

| Resol | Nature | R1 | R1 | R1 | R2' | R2' | R2' | R3' | R3' | R3' | R3' | R3' |
|---|---|---|---|---|---|---|---|---|---|---|---|---|
|  | amount (g) | 100 | 100 | 100 | 100 | 100 | 100 | 100 | 100 | 100 | 100 | 100 |
| Hardener | Nature | S1 | S14 | S15 | S1 | S14 | S15 | S1 | S1 | S14 | S15 | S16 |
| Solution | amount (g) | 20 | 20 | 20 | 20 | 20 | 20 | 20 | 15 | 20 | 20 | 30 |
| Pot life at 25° C. (minutes) |  | 13 | 20 | 10 | 5 | 10 | 4 | 7 | 12 | 7 | 5 | 30 |

EXAMPLE 6

By using resol R3 and solutions S1–S10–S13–S14–S15 and S16 in place of solid $B_2O_3$ laminates were prepared with glass fiber mats by injection or projection using the processes described in the U.S. Pat. No. 4,123,414. The obtained products were homogeneous and had a good aspect.

What is claimed is:

1. A concentrated, substantially anhydrous boric anhydride solution which comprises (1) at least 5 percent by weight of boric anhydride; (2) at least one solvent selected from the group consisting of mono alcohols, poly alcohols, trialkylborates and dialkyl acetals of formol; and (3) from 5 to 70 percent by weight, based on the weight of solution, of at least one acid selected from the group consisting of sulfuric acid and sulfonic acids.

2. A concentrated boric anhydride solution according to claim 1, wherein the amount of acid is at least 10 percent by weight based on the weight of solution.

3. A concentrated boric anhydride solution according to claim 1, wherein the amount of acid is from 15 to 50 percent by weight based on the weight of solution.

4. A concentrated boric anhydride solution according to claim 1, wherein the boric anhydride concentration is from 10 to 35 percent by weight.

5. A concentrated boric anhydride solution according to claim 1, which comprises:
10 to 35 percent by weight of boric anhydride;
15 to 50 percent by weight of acid; and 30 to 60 percent by weight of organic solvent.

6. A concentrated boric anhydride solution according to claim 1, wherein the solvent is a mixture of trimethyl borate and methanol.

7. A concentrated boric anhydride solution according to claim 1, wherein the solvent is a mixture of trimethyl borate and methylal.

8. A concentrated boric anhydride solution according to claim 5, wherein the solvent is a mixture of trimethyl borate and methanol.

9. A concentrated boric anhydride solution according to claim 5, wherein the solvent is a mixture of trimethyl borate and methylal.

10. A concentrated boric anhydride solution according to claim 1, wherein the acid is sulfuric acid.

11. A concentrated boric anhydride solution according to claim 5, wherein the acid is sulfuric acid.

12. A concentrated boric anhydride solution according to claim 1, wherein the acid is para-toluenesulfonic acid.

13. A concentrated boric anhydride solution according to claim 5, wherein the acid is para-toluenesulfonic acid.

14. A solution according to claim 1, which is clear and anhydrous.

15. A solution according to claim 4, which is clear and anhydrous.

16. A solution according to claim 5, which is clear and anhydrous.

17. A solution according to claim 1, wherein the said at least one solvent comprises a trialkyl borate.

18. A solution according to claim 14, wherein the said at least one solvent comprises a trialkyl borate.

* * * * *